United States Patent
Calcev et al.

(10) Patent No.: US 9,854,596 B2
(45) Date of Patent: Dec. 26, 2017

(54) SYSTEM AND METHOD FOR SECTORIZED TRANSMISSION IN A WIRELESS NETWORK

(71) Applicant: FutureWei Technologies, Inc., Plano, TX (US)

(72) Inventors: George Calcev, Hoffman Estates, IL (US); Lin Cai, Schaumburg, IL (US); Bin Chen, Schaumburg, IL (US); Lukasz Krzymien, Rolling Meadows, IL (US)

(73) Assignee: Futurewei Technologies, Inc., Plano, TX (US)

( * ) Notice: Subject to any disclaimer, the term of this patent is extended or adjusted under 35 U.S.C. 154(b) by 327 days.

(21) Appl. No.: 13/784,555

(22) Filed: Mar. 4, 2013

(65) Prior Publication Data

US 2013/0230028 A1    Sep. 5, 2013

Related U.S. Application Data

(60) Provisional application No. 61/606,830, filed on Mar. 5, 2012.

(51) Int. Cl.
*H04W 74/08* (2009.01)
*H04W 72/12* (2009.01)
(Continued)

(52) U.S. Cl.
CPC ....... *H04W 72/1231* (2013.01); *H04L 1/0002* (2013.01); *H04L 1/0041* (2013.01);
(Continued)

(58) Field of Classification Search
CPC ......... H04W 72/1231; H04W 74/0816; H04W 72/046; H04L 1/0041; H04L 1/0002; H04L 2001/0093
See application file for complete search history.

(56) References Cited

U.S. PATENT DOCUMENTS

| | | | |
|---|---|---|---|
| 6,556,824 B1 * | 4/2003 | Purnadi | H04W 4/00 455/432.3 |
| 7,379,446 B2 * | 5/2008 | Laroia | H04L 5/0044 370/278 |

(Continued)

FOREIGN PATENT DOCUMENTS

| | | |
|---|---|---|
| CN | 101621806 A | 1/2010 |
| CN | 101897154 A | 11/2010 |

(Continued)

OTHER PUBLICATIONS

"IEEE P802.11ahTM/D0.1 Draft Standard for Information technology—Telecommunications and information exchange between systems Local and metropolitan area networks—Specific requirements", Section 9.32m Sectorized beam operation, pp. 150-158, May 2013.*

(Continued)

*Primary Examiner* — Andrew Lai
*Assistant Examiner* — Chuong M Nguyen
(74) *Attorney, Agent, or Firm* — Slater Matsil, LLP

(57) ABSTRACT

The hidden node problem can be avoided by scheduling stations in different sectors to perform transmissions during different time periods. Sectorized scheduling can be communicated to stations through transmission of beamformed beacon signals at the beginning of respective time periods. For instance, a first beamformed beacon signal may be transmitted to stations in a first sector at the beginning of a first time period, while a second beamformed beacon signal may be transmitted to stations in a second sector at the beginning of a second time period.

32 Claims, 6 Drawing Sheets

(51) Int. Cl.
 *H04L 1/00* (2006.01)
 *H04W 72/04* (2009.01)
(52) U.S. Cl.
 CPC . *H04W 74/0816* (2013.01); *H04L 2001/0093* (2013.01); *H04W 72/046* (2013.01)

(56) References Cited

U.S. PATENT DOCUMENTS

| | | | | |
|---|---|---|---|---|
| 8,767,640 | B2* | 7/2014 | Lakkis | H04W 74/08 370/329 |
| 8,917,675 | B2* | 12/2014 | Qin | H04W 74/08 370/329 |
| 2002/0089951 | A1* | 7/2002 | Hyun | H04W 92/02 370/335 |
| 2002/0163933 | A1* | 11/2002 | Benveniste | H04L 1/0003 370/465 |
| 2006/0105771 | A1* | 5/2006 | Iacono | H04W 16/28 455/446 |
| 2006/0164969 | A1* | 7/2006 | Malik | H04B 7/0408 370/203 |
| 2009/0022173 | A1 | 1/2009 | Horn et al. | |
| 2009/0080384 | A1* | 3/2009 | Leung | H04W 72/082 370/336 |
| 2009/0103501 | A1* | 4/2009 | Farrag et al. | 370/337 |
| 2009/0207769 | A1* | 8/2009 | Park | H04W 74/04 370/311 |
| 2009/0232023 | A1* | 9/2009 | Soffer | H01Q 3/26 370/254 |
| 2010/0046447 | A1* | 2/2010 | Palanki | H04L 27/261 370/329 |
| 2010/0260046 | A1 | 10/2010 | Reumerman et al. | |
| 2011/0039568 | A1* | 2/2011 | Zhang | H04W 52/50 455/452.1 |
| 2011/0211616 | A1* | 9/2011 | Taghavi Nasrabadi | H04B 1/707 375/146 |
| 2012/0327914 | A1 | 12/2012 | Kang et al. | |
| 2013/0230035 | A1* | 9/2013 | Grandhi | H04W 48/16 370/338 |

FOREIGN PATENT DOCUMENTS

| | | |
|---|---|---|
| CN | 102083094 A | 6/2011 |
| EP | 2328370 A1 | 6/2011 |
| JP | 2008166879 A | 7/2008 |
| KR | 200866879 | 7/2008 |
| KR | 2008166879 | 7/2008 |
| KR | 20100009617 A | 1/2010 |
| KR | 20100068466 | 6/2010 |
| KR | 102110097564 A | 8/2011 |
| WO | 2009039473 A2 | 3/2009 |

OTHER PUBLICATIONS

"Definitions, acronyms, and abbreviations," IEEE Std 802.1ah/D0.1, May 2013.

"IEEE Standard for Local and metropolitan area networks—Virtual Bridged Local Area Networks Amendment 7: Provider Backbone Bridges," IEEE Std 802.1ah™—2008 (Amendment to IEEE Std. 802.1Q-2005).

* cited by examiner

SYSTEM AND METHOD FOR SECTORIZED TRANSMISSION IN A WIRELESS NETWORK

This application claims the benefit of U.S. Provisional Application No. 61/606,830 filed on Mar. 5, 2012, entitled "System and Method for Sectorized Transmission in a Wireless Network," which is incorporated herein by reference as if reproduced in its entirety.

TECHNICAL FIELD

The present invention relates to a system and method for wireless communications, and, in particular embodiments, to systems and methods for sectorized transmission in a wireless network.

BACKGROUND

In wireless fidelity (Wi-Fi) networks, mobile stations (STAs) accessing the uplink communications channel employ a carrier sense multiple access with collision avoidance (CSMA/CA) technique to avoid collisions with other STAs accessing the uplink channel. More specifically, a STA will verify that the uplink channel is idle before performing an uplink transmission, which tends to reduce collisions, where two STAs are transmitting at the same time. This CSMA/CA technique works relatively well when STAs utilize moderate to high transmit power in mid-to-small sized wireless local area networks (WLANs), e.g., radius less than fifty meters, as STAs are typically able detect one another's uplink transmissions, and thereby avoid transmissions that will result in a collision.

SUMMARY OF THE INVENTION

Technical advantages are generally achieved, by embodiments of this disclosure which describe systems and methods for sectorized transmission in a wireless network.

In accordance with an embodiment, a method for scheduling in a wireless network is provided. In this example, the method includes scheduling transmissions for multiple groups of mobile stations (STAs) in a multi-sector coverage area. Groups of STAs positioned in different sectors of the multi-sector coverage area are scheduled to perform transmissions during different time periods. The method further includes transmitting a first signal to a first group of STAs positioned in a first sector of the multi-sector coverage area. The first signal indicates that the first group of STAs is scheduled to perform transmissions during a first time period. The first time period is different from a second time period during which a second group of STAs is scheduled to perform transmissions. An apparatus configured to perform this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

The above discussed CSMA/CA techniques may be less effective in larger WLANs (e.g., radius exceeding fifty meters) and/or when STAs typically use low transmit power, as STAs may often be unable to detect one another's transmissions. More specifically, a hidden node problem (as discussed in greater detail below in reference to FIG. 2) occurs when two or more STAs located outside of one another's carrier range perform simultaneous transmissions to a centrally located base station, thereby resulting in a collision. The hidden node problem is a significant concern for next generation Wi-Fi networks, some of which are likely to include large cells as well as high numbers of low transmit power STAs. For instance, Institute of Electrical and Electronics (IEEE) 802.11ah is a next-generation Wi-Fi standard for smart sensors and metering, and will likely be implemented in WLANs having a radius of up to one kilometer and housing high numbers of low transmit-power sensor devices. Accordingly, mechanisms for addressing the hidden node problem in Wi-Fi networks is desired.

Aspects of this disclosure avoid the hidden node problem by scheduling transmissions in different sectors during different time periods. More specifically, STAs in the same sector are more likely to be within one another transmission range, and are therefore more likely to detect one another's carrier transmissions. As a result, scheduling STAs in different sectors to transmit during different time periods may significantly reduce collisions resulting from the hidden node problem. Scheduling of sectors is communicated to sectors via transmission of beamformed beacon signals at the beginning of respective time periods. For instance, a first beamformed beacon signal may be transmitted to STAs in a first sector at the beginning of a first time period, while a second beamformed beacon signal may be transmitted to STAs in a second sector at the beginning of a second time period.

Figure 1:
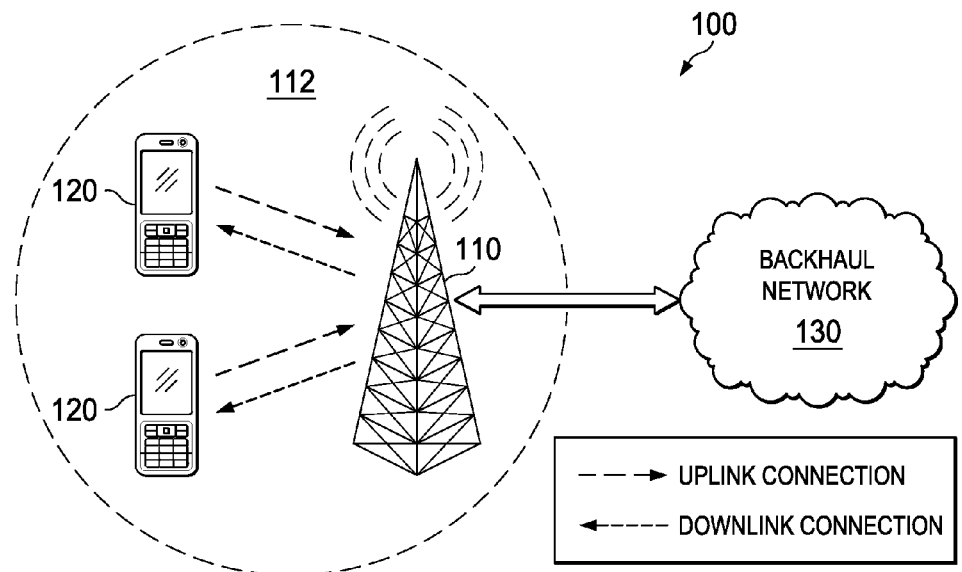
FIG. 1 illustrates a diagram of a wireless network for communicating data.

FIG. 1 illustrates a network 100 for communicating data. The network 100 comprises an access point (AP) 110 having a coverage area 112, a plurality of STAs 120, and a backhaul network 130. The AP 110 may comprise any component capable of providing wireless access by, inter alia, establishing uplink (dashed line) and/or downlink (dotted line) connections with the STAs 120. The AP 110 can also be referred as a base station, an enhanced base station (eNB), a femtocell, a controller and other wirelessly enabled devices. The STAs 120 may comprise any component capable of establishing a wireless connection with the AP 110. The STA 120 can be referred as a user equipment, a mobile station, or any other wireless devices. The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
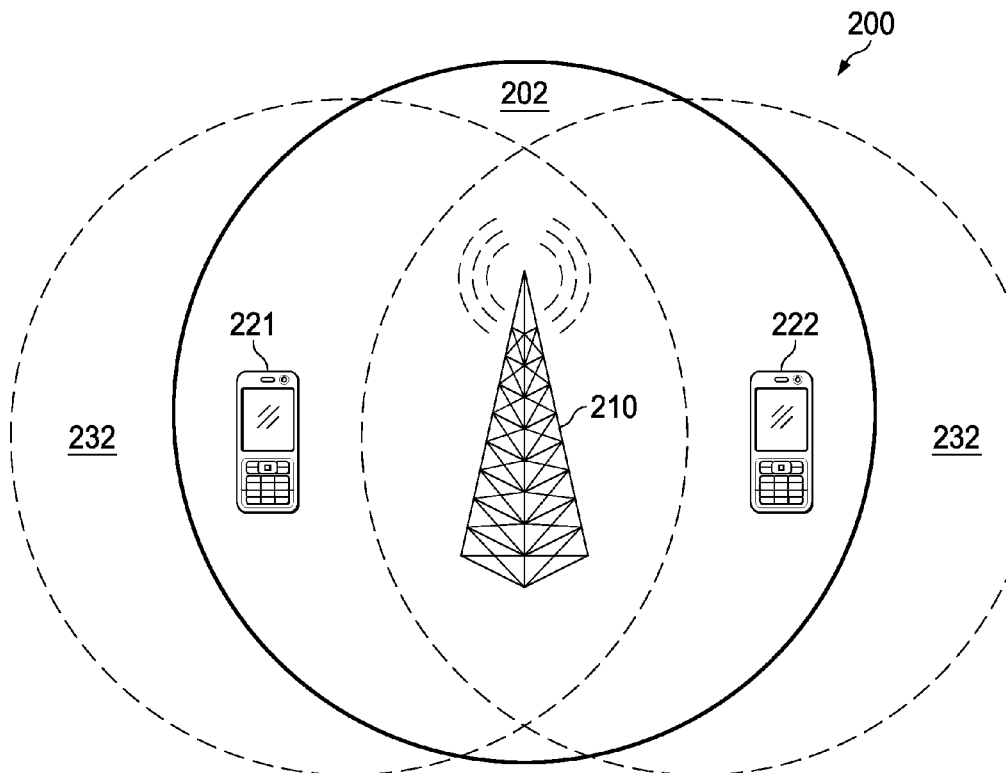
FIG. 2 illustrates a diagram of a hidden node problem in a communications network.

A hidden node problem may occur when transmitters employing CSMA/CA transmission techniques are outside of one another's transmission range. FIG. 2 illustrates a hidden node problem in a communications network 200. As shown, the network 200 includes a base station 210 having a serving cell 202, a transmitter 221 having a transmission range 232, and a transmitter 222 having a transmission range 232. As shown, the transmitters 221-222 are positioned within the cell 202, and therefore may attempt to perform transmissions to the base station 210 in accordance with a CSMA/CA transmission technique. However, since the STA 221 is outside the transmission range 232 of the STA 222, the STA 221 may be unable to detect carrier signals of the STA 222. Likewise, because the STA 222 is outside the transmission range 231 of the STA 221, the STA 222 may be unable to detect carrier signals of the STA 221. As such, the STAs 221-222 may perform sequential (or overlapping) transmissions that collide or are otherwise decodable by the base station 210. Such a situation may often be referred to as the hidden node problem.

Figure 3:
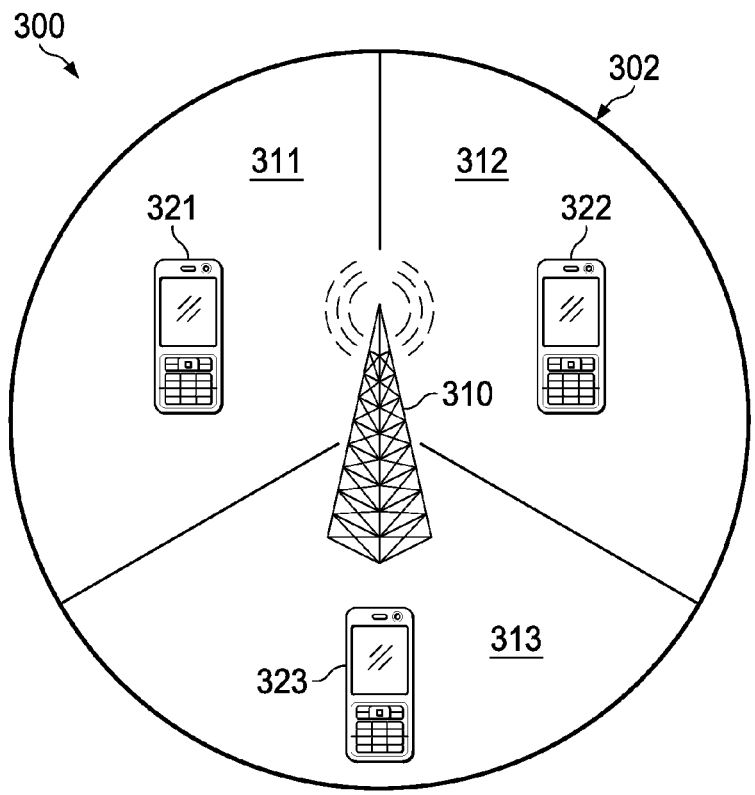
FIG. 3 illustrates a diagram of an embodiment network configured for sectorized transmissions.

Aspects of this disclosure avoid the hidden node problem by scheduling transmissions sector by sector. While the transmissions of this disclosure are often discussed in the context of "uplink transmissions," aspects of this disclosure are applicable to any transmission from a STA or other wireless device, e.g., direct transmissions, device-to-device (D2D) transmissions, etc. FIG. 3 illustrates a network 300 configured for sectorized transmissions. The network 300 includes a base station 310 having a serving cell 302, which is divided into a plurality of sectors 311-313 each of which housing a respective one of the STAs 321-323. In embodiments, collisions resulting from the hidden node problem may be avoided in the network 300 by scheduling each of the sectors 311, 312, and 313 to perform transmissions at different times. For instance, the sector 311 may be scheduled for transmission during a first period, the sector 312 may be scheduled for transmission during a second period, and the sector 313 may be scheduled for transmission during a third period. In some embodiments, scheduling of the transmissions may be achieved through broadcasting a beacon signal at the beginning of a respective period. For instance, the base station 310 may transmit a first beacon signal to mobile stations in the sector 311 to initialize the first period. After expiration of the first period, the base station may transmit a second beacon signal to mobile stations in the sector 312 to initialize the second period. Following expiration of the second period, the base station may transmit a third beacon signal to mobile stations in the sector 313 to initialize the third period. The first beacon may be a beamformed signal directed at spatial locations within the sector 311, the second beacon may be a beamformed signal directed at spatial locations within the sector 312, and the third beacon may be a beamformed signal directed at spatial locations within the sector 313.

Figure 4:
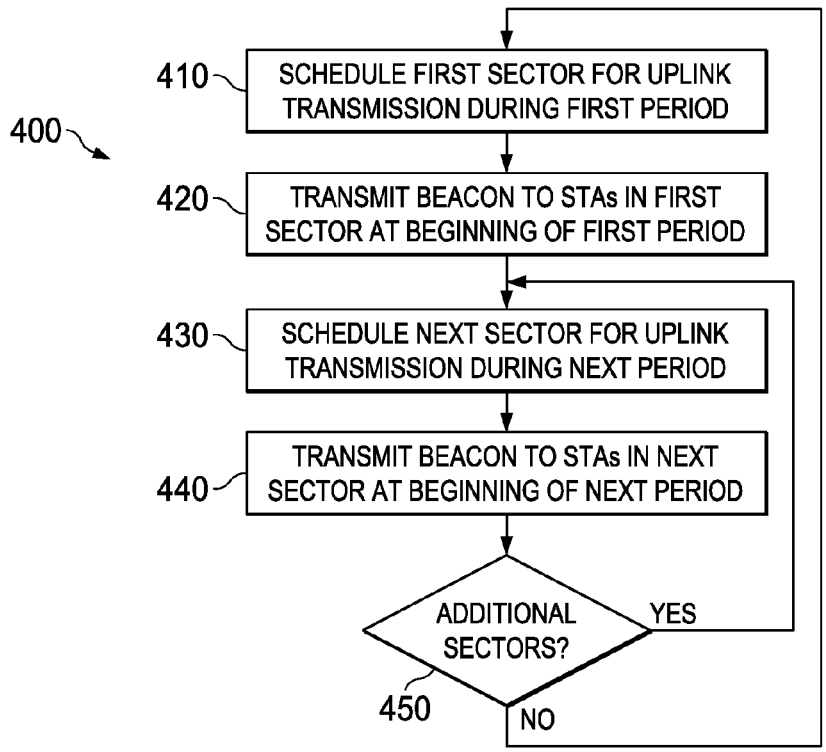
FIG. 4 illustrates a flowchart of an embodiment method for scheduling transmissions.

FIG. 4 illustrates a method 400 for scheduling transmissions, as might be performed by a base station. The method 400 begins at step 410, where the base station schedules a first sector for transmissions during a first period. Thereafter, the method 400 proceeds to step 420, where the base station transmits a beacon to STAs located in the first sector at the beginning of the first period. Next, the method 400 proceeds to step 430, where the base station schedules the next sector for transmission during next period. Subsequently, the method 400 proceeds to step 440, where the base station transmits a beacon to STAs in the next sector at the beginning of the next period. Next, the method 400 proceeds to step 450, where it is determined whether additional sectors need to be scheduled. If so, the method 400 reverts back to step 430, where the next sector is scheduled for transmission. Otherwise, the method 400 reverts back to step 410, where the first sector is once again scheduled.

Figure 5:
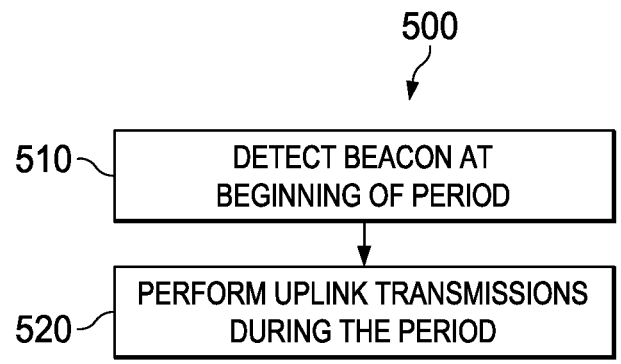
FIG. 5 illustrates a flowchart of an embodiment method for performing transmissions.

FIG. 5 illustrates a method 500 for performing transmissions, as might be performed by a STA. The method 500 begins at step 510, where the STA detects a beacon signal at a beginning of a period. Next the method 500 proceeds to step 520, where the STA performs transmission during the period. In embodiments, the STA may perform transmissions in accordance with CSMA/CA.

Figure 6:
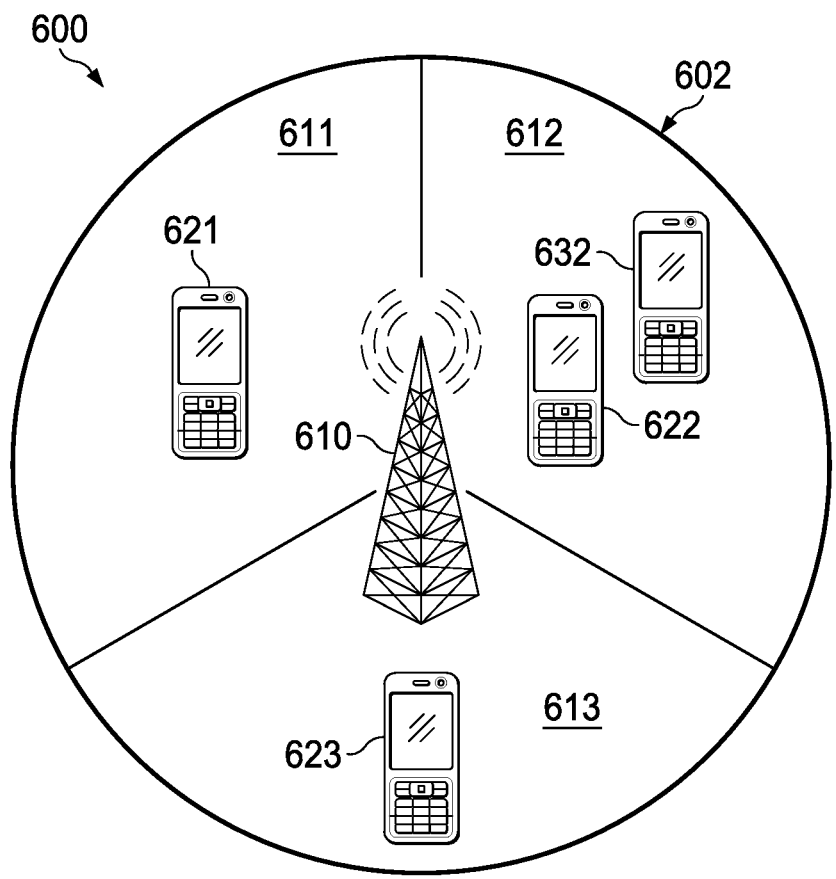
FIG. 6 illustrates a diagram of another embodiment network configured for sectorized transmissions.

In some examples, the beacon may include a scheduling indicator that is selectively directed a certain group of STAs within a sector. For instance, the beacon's scheduling indicator may specify a group number, traffic type, traffic class, or some other characteristic associated with the group of STAs. In one embodiment, the beacon may schedule STAs having high SNRs (e.g., cell-center STA) without scheduling STAs having low SNRs (e.g., cell-edge STAs) by encoding the scheduling indicator at a rate that is decodable only by STAs having an SNR exceeding a certain level or threshold. FIG. 6 illustrates a network 600 configured for sectorized transmissions. The network 600 includes a base station 610 having a serving cell 602, which is divided into a plurality of sectors 611-613 housing a plurality of STAs 622, 623, and 633. Notably, the sector 612 houses a STA 622 positioned near the center of the cell 602, and a cell 632 positioned near the edge of the cell 602. Due to their relative positions to the base station 610, the STA 622 may have a higher SNR than the STA 632. In some implementations, it may be desirable to schedule the STA 622 without scheduling the STA 632. In such a case, the base station 610 may transmit a beacon comprising a scheduling indicator that is encoded at a coding rate such that the scheduling indicator is decodable by the STA 622, but not by the STA 632.

In some embodiments, the scheduling of STAs is performed in accordance with a channel quality criteria. For instance, scheduling may be performed in accordance with a received signal strength indication (RSSI) or a signal to interference ratio (SINR) of a beacon signal. In one embodiment, the beacon contains an information element that specifies schedules for STAs having various levels and/or ranges of channel quality, e.g., RSSI, SINR, or otherwise. For instance, an AP may schedule STAs having different signal strengths or signal qualities to different time intervals. As an example, an AP may schedule STAs having channel quality that is less than a threshold to a first time interval, while scheduling STAs having channel quality equal to or exceeding the threshold to a second time interval. Indeed, the AP may schedule based on ranges of channel quality such that STAs having a channel quality within a certain range (e.g., first range, second range, third range, etc.) are scheduled to transmit during a respective interval. In some embodiments, STAs having a channel quality that exceeds a threshold may be permitted to transmit during any interval, while STAs having lower channel qualities may be limited to certain intervals. Scheduling information (e.g., time intervals, channel quality thesholds/ranges, etc.) may be specified in the beacon, during association, in a probe response during discovery. Additionally, at least some of the scheduling information may be a priori information. In accordance with the above discussed aspects of this disclosure, different stations located at different distances can be scheduled for different durations, which may achieve improved fairness and/or network performance (e.g., fewer hidden node collisions). Scheduling in accordance with channel quality may be combined with other scheduling strategies. For instance, scheduling may be performed in accordance with channel quality as well as another criteria (e.g., sector location, group number, traffic type, device type, etc.) to achieve diverse scheduling arrangements. In an embodiment, a receiving STA measures a signal strength received in a signal (e.g., beacon or otherwise), and then compares the signal strength value with the channel quality thresholds (e.g., indicated by the beacon, or otherwise) to determine which time interval to transmit, receive, sleep, etc. In the current IEEE 802.11 standards, channel access is based on a CSMA/CA method, where each station listens to the channel prior to transmission.

Figure 7:
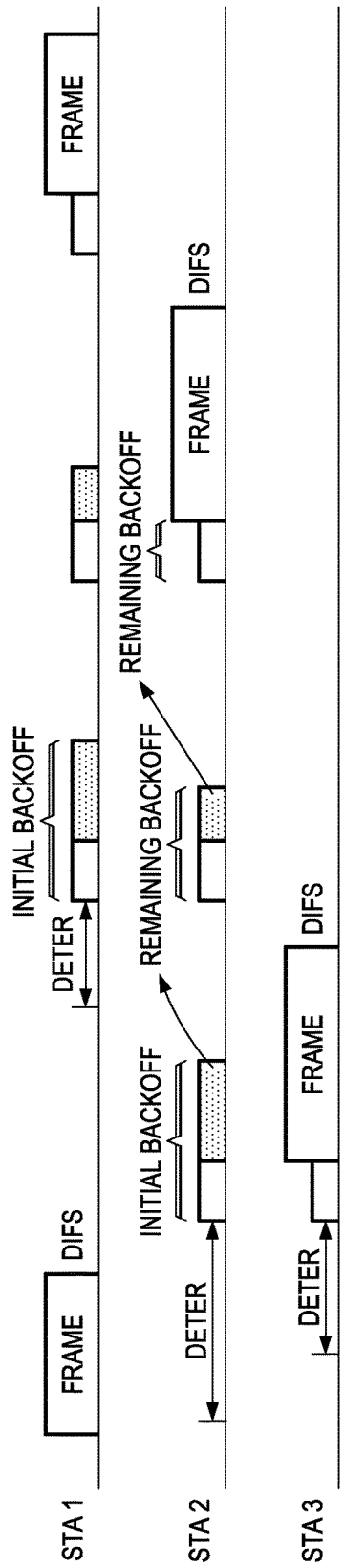
FIG. 7 illustrates a diagram of a channel.

However, when stations (STAs) are located in different areas and are out of the carrier sensing range of each other, e.g., STA1 and STA2 in FIG. 7 cannot hear each other, and thus are likely to transmit to the access point (AP) at the same time, which causes collisions. This is generally known as the hidden node problem. Collisions due to the hidden node problem will result in packet losses and retransmissions, which degrade the channel utilization and the quality of service (QoS) of users. In an IEEE 802.11ah network where sensors use very low power to transmit over a long distance, it is expected that hidden node problem could be more severe as the low transmission power and high path loss make it more difficult for STAs to detect the ongoing transmissions of sensors. Mitigating the hidden node problem generally should improve the performance of an 802.11ah network.

One way to reduce collisions among bursty channel accesses of a large number of users is to group STAs and allow different groups of STAs to access the channel during different time periods. There are different ways to group users. For example, user grouping can be based on the MAC address of users, or based on the types of applications or QoS requirements of users. Grouping is helpful to reduce the number of contending STAs, and thus is efficient to improve the network resource utilization. However, such grouping approaches are not specifically designed to mitigate the hidden node problem.

For an IEEE 802.11ah network that consists of both high power offloading STAs and low power sensors/smart meters, it is recognized that low power sensors are more likely hidden from other STAs and failed in contentions. One way to alleviate the unfair channel access between high power users and low power sensors is to divide STAs into two groups with different power levels. And high power and low power STAs should contend in different time periods. This approach can eliminate the collisions between high power STAs and low power STAs. However, contentions between high power STAs and between low power STAs still exist, and low power sensors suffer from hidden node problem as before. In addition, it is critical to determine the time periods reserved for high/low power STAs, especially when the number of offloading STAs may change over time. An inappropriate setting of time periods generally will degrade the network performance.

An embodiment uses sectorized channel access to alleviate the hidden node problem in 802.11 networks. Embodiments may be applied to Wi-Fi networks and devices, such as Wi-Fi access points (APs) and Wi-Fi stations (STAs).

Sectorization is a method used in cellular systems to reduce interference. However, in a cellular system the users are allowed to access the base station continuously. In contrast, in an embodiment a user can send/receive only during the sector contention duration, which is signaled in the sector beacon. Further, an embodiment allows sectors to be dynamically adjusted, rotated in space and in time to minimize the collisions and interference.

Figure 8:
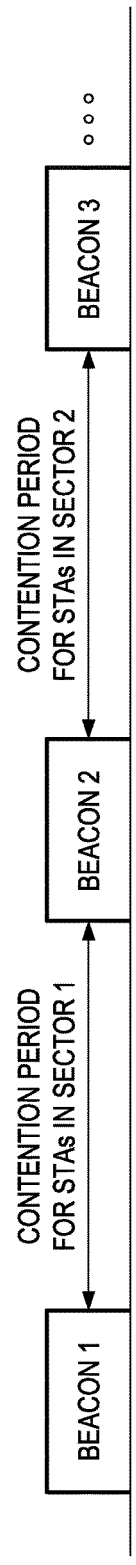
FIG. 8 illustrates a diagram of an embodiment for sectorized channel access.

A simple way of efficient sectorized channel access is shown in FIG. 8. The AP first broadcasts a beacon to the STAs in the first sector. Upon receiving the beacon with the sector information, STAs in the first sector contend for channel access in the following sector contention period. After that, the AP switches to another sector, and broadcasts a beacon so that STAs in that sector can contend for channel access in the following time period. The AP can switch between sectors in a round robin manner or in other deterministic or random sequences. The AP also can record the STAs associated in each sector and use this information for Traffic Information Map signaling of downlink traffic if needed. It is also possible that some STAs may hear multiple beacons in different sectors. In this case, the STAs can select one sector to associate with, e.g., select the sector with a higher received signal strength indicator (RSSI). When a STA observes a decreased RSSI in one sector and decides to switch to another sector with a higher RSSI, the STA may or may not update with the AP. A station may or may not inform the AP about the change of its sector via management frames. A STA may provide feedback to the AP with the sector ID. The feedback may indicate received channel quality, e.g., a signal strength of the received beacon. The AP may then use the feedback information for various scheduling or other purposes. For instance, the AP may use the feedback information to schedule transmissions (downlink, uplink, or otherwise), to determine the STA location (with various degrees of precision), to schedule direct link communications between two stations in the same sector or between stations in different sectors. The feedback information may also be used to adjust sector size for load balancing or group sizes for load balancing. In an embodiment, one or more stations may be allowed to transmit at any time (e.g., by default) irrespective of the sector. For instance, stations belonging to a certain group (e.g., group ID 0) may be permitted to transmit at any time by default, which may allow those stations to transmit prior to association. The default group of stations may be changed during association, which may allow the network administrator to restrict transmission by some stations in sectors reserved for a specific group.

In an embodiment, the association can be implemented as follows. A STA that comes into the AP coverage is waiting to receive a beacon. The beacon carries information about the BSS ID, the sector index, the duration of the sector contention period as well as the period until the next beacon occurrence. When a STA receives a beacon it can decide to associate to the AP using that sector index. In the period following the beacon reception the STA can contend to the channel access as long as the message does not pass beyond the sector contention duration. In the association process the AP respond to a STA in the contention period of the same sector. The association ID (AID) allocated to the STA could be selected from a set of AIDs dedicated to that particular sector or from a pool of AIDs called nomadic AIDs, which are dedicated to STAs that frequently change their location. The AIDs are used to identify STAs for the downlink traffic. The AP uses a Traffic Information Map (TIM) to signal which AID index has traffic in the following sector interval. If the STA is associated with a nomadic AID its information for downlink traffic could be broadcast in all beacons. In another embodiment, the TIM map is identical in all beacons, i.e. AIDs are not necessarily associated with a particular sector. However in an alternative embodiment a learning algorithm can be used to map AIDs to particular sectors, thus minimizing the TIM size. For instance, after many replies received from a STA in a particular sector that STA can be associated only with that sector. Later, if one reply or more replies are not received in that particular sector from that particular STA for a paging message, the STA can be paged (via TIM map) in all sectors and declared nomadic. In a different embodiment, a STA can associate itself as fixed (not mobile), which means that the STA will remain for long time in that sector.

There are several methods for management of the STAs' sector status. In one method the AP maintains a STA's sector status via association or sector switch procedure, i.e., during the association procedure, the STA and AP negotiate a sector for the STA, and after the association, if the STA switches to another sector, it performs a sector switch and lets the AP know of the switching. In another method the AP doesn't maintain a STA's sector status. When a STA wants to get data from the AP, it sends a message (e.g. PS-poll) to the AP, and the message includes an indicator of the sector. The AP gets the sector indicator and sends data to the STA if there is any data pending for it.

In another embodiment the sector size and duration are variable. A STA is aware about the next period of time it is allowed to transmit or receive data via the beacon information of sector contention duration as well as the next beacon occurrence. The AP can dynamically rotate or adjust the size and duration of sectors in order to minimize the hidden node problem. The TIM map can be broadcast in all beacons. A STA would dynamically select its own sector based on the RSSI level.

Figure 9:
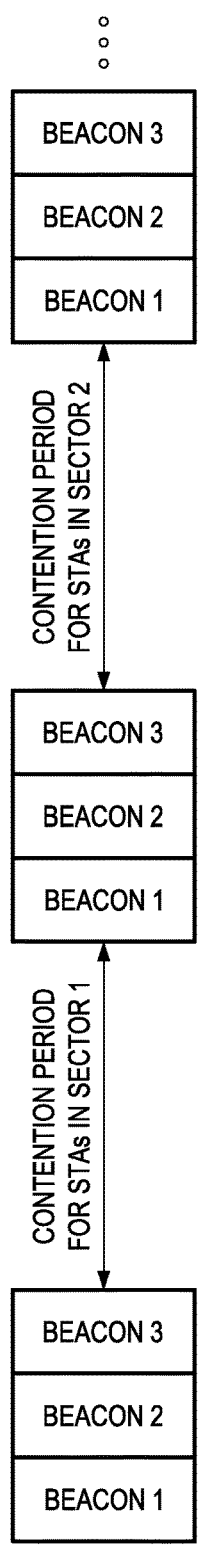
FIG. 9 illustrates a diagram of another embodiment for sectorized channel access.
Figure 10:
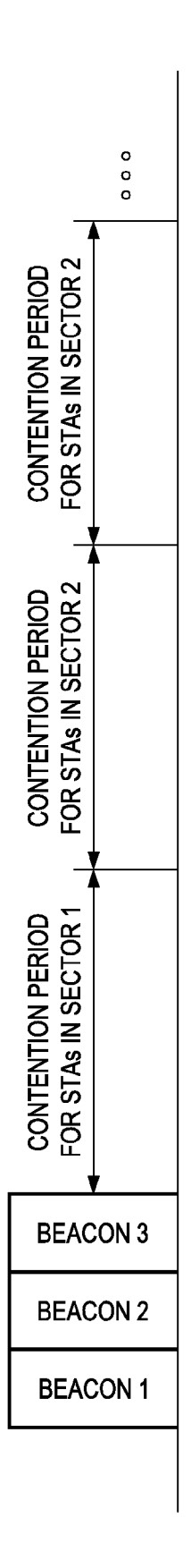
FIG. 10 illustrates a diagram of yet another embodiment for sectorized channel access.

Another embodiment allows the AP to broadcast a beacon to all or multiple sectors before each contention period. As shown in FIG. 9, the AP can transmit beacons in different sectors in a sequence to inform STAs of the current active sector for channel access. Upon receiving the beacons, STAs in the active sector contend for channel access while STAs in other sectors can go to sleep until their associated sector becomes active for channel access. This embodiment generally is more energy efficient for low duty cycle sensors at the cost of more beacons broadcast in multiple sectors. To further reduce the beacon overhead, another embodiment is to broadcast beacons in multiple sectors once, followed by contention periods for STAs in different sectors, as shown in FIG. 10. This embodiment generally strikes a tradeoff between the energy efficiency and overhead reduction.

Figure 11:
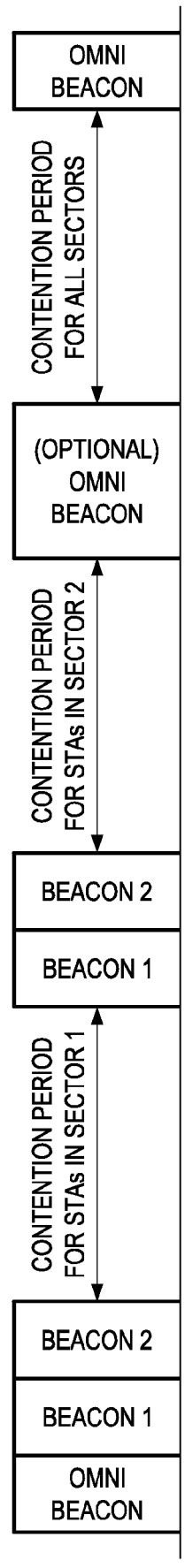
FIG. 11 illustrates a diagram of an embodiment for sectorized channel access using an omni-directional beacon.
Figure 12:
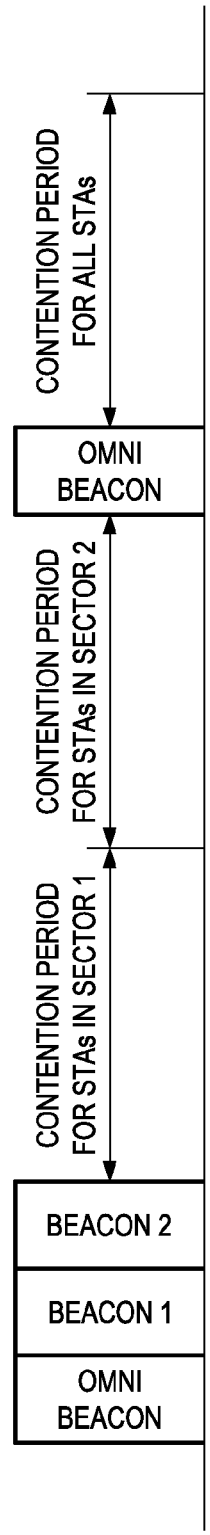
FIG. 12 illustrates a diagram of another embodiment for sectorized channel access using an omni-directional beacon.

A different embodiment uses two types of beacons such omni beacons and sector beacons. FIGS. 11-12 illustrate sectorized channel access including an omni beacon. A sector beacon contains the data to access a particular sector as well as the TIM for fixed stations associated with that sector and nomadic stations not associated with a fixed sector. An omni beacon is transmitted periodically after all sectors are parsed. The time division between two omni beacons can contain a sectorized time interval when the channel access is done via the sector access method as described above, and non-sectorized access when all the stations can compete for the channel access irrespective of their location. An optional omni beacon can be broadcast to mark the beginning of non-sectorized time interval when all the STA could access the channel.

The various embodiments can be combined with other methods of channel access as well. For example, the contention period in a single sector can be divided between low and high power nodes, etc. In an embodiment, beacons may be transmitted consecutively at designated intervals, e.g., intervals designated data transmission in various sectors. For instance, transmission of a first beacon for a first sector may be followed by transmission of a second beacon for a second sector, which may be followed by transmission of an omnidirectional beacon (e.g., for all sectors in the cell). This consecutive sequence of beacons (e.g., first beacon, second beacon, omni-directional beacon) may be repeated.

There are several possible methods to implement sectorization. In an IEEE 802.11 network, the access point can employ multiple antenna elements, e.g., a sectorized antenna with fixed beamwidth and directions, or an adaptive array antenna that can adaptively adjust the beamwidth towards the desirable directions. Without loss of generality, consider the AP uses a directional antenna and communication with STAs within its beamwidth; the AP rotates the directions in a sequence to communicate with all STAs in the network.

In an embodiment, the sectorized beacon can be identified by a bit or a sequence of bits in the PHY preamble (signal (SIG) field) or in the MAC header or in a data payload of the beacon. Another way to identify the sectorized beacon is a particular rotation of the constellation such quadrature binary phase shift keying (QBPSK).

In another embodiment, when an AP receives an association request or a probe request it can respond with a probe response that specifies the sector where the sender belongs to. For instance the AP can use an antenna array to identify the direction of the incoming probe request, and then it can reply with a probe response, which contains an index or type of identification of the sector.

In another embodiment the sector information can be asked by a STA at any time via an explicit message or a message piggy-backed on other message. The AP can then either send the sector information via a unicast message to the requester, or collect several requests and send the information via a broadcast message that identifies the station and the sector index the sector belongs to.

More generally, an embodiment allows channel access in a particular space region at particular time for a particular duration. This method can be associated with other sleep/power save schedule methods.

In another embodiment, several APs exchange information about their scheduling in different space zones such that the interference can be minimized via a distributed or a centralized method.

Figure 13:
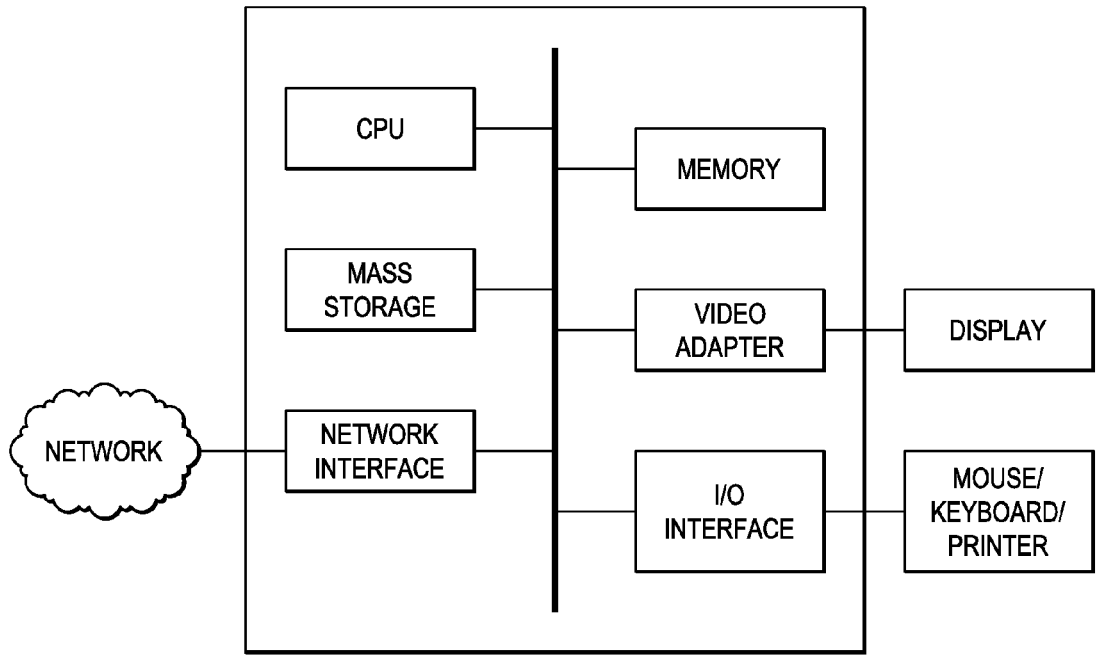
FIG. 13 is a block diagram illustrating a computing platform.

FIG. 13 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 14:
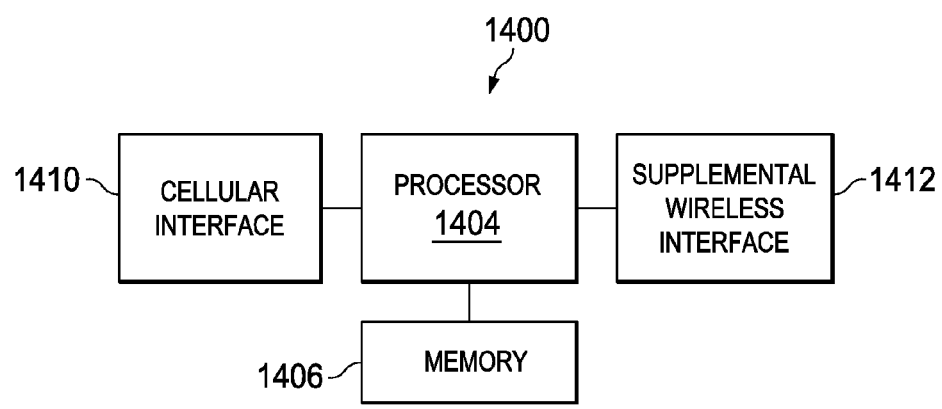
FIG. 14 illustrates a block diagram of an embodiment communications device.

FIG. 14 illustrates a block diagram of an embodiment of a communications device 1400, which may be equivalent to one or more devices (e.g., UEs, NBs, etc.) discussed above. The communications device 1400 may include a processor 1404, a memory 1406, a cellular interface 1410, a supplemental wireless interface 1412, and a supplemental interface 1414, which may (or may not) be arranged as shown in FIG. 14. The processor 1404 may be any component capable of performing computations and/or other processing related tasks, and the memory 1406 may be any component capable of storing programming and/or instructions for the processor 1404. The cellular interface 1410 may be any component or collection of components that allows the communications device 1400 to communicate using a cellular signal, and may be used to receive and/or transmit information over a cellular connection of a cellular network. The supplemental wireless interface 1412 may be any component or collection of components that allows the communications device 1400 to communicate via a non-cellular wireless protocol, such as a Wi-Fi or Bluetooth protocol, or a control protocol. The device 1400 may use the cellular interface 1410 and/or the supplemental wireless interface 1412 to communicate with any wirelessly enabled component, e.g., a base station, relay, mobile device, etc. The supplemental interface 1412 may be any component or collection of components that allows the communications device 1400 to communicate via a supplemental protocol, including wire-line protocols. In embodiments, the supplemental interface 1412 may allow the device 1400 to communicate with another component, such as a backhaul network component.

Institute of Electrical and Electronics Engineers (IEEE) standards publication 802.11ah is incorporated herein by reference in its entirety.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for sectorized transmissions comprising:
   scheduling, by a controller, contention-based transmissions for multiple groups of mobile stations (STAs) in a multi-sector coverage area of a Wi-Fi network; allowing one or more STAs belonging to a default group to transmit at any time prior to association;
   during association, scheduling groups of STAs positioned in different sectors of the multi-sector coverage area to perform contention-based transmissions during different time periods such that STAs contend for resources with other STAs in the same sector without contending for resources with STAs in different sectors; and
   transmitting, by the controller, a first directional beacon signal to a first group of STAs positioned in a first sector of the multi-sector coverage area, the first directional beacon signal including control signaling and excluding bearer data, wherein the first directional beacon signal indicates that the first group of STAs is scheduled to perform contention-based transmissions during a first time period, and wherein the first time period is different from a second time period during which a second group of STAs positioned in a second sector of the multi-sector coverage area is scheduled to perform contention-based transmissions, the first directional beacon signal including a group identifier (ID) list, wherein STAs associated with non-zero group IDs that are excluded from the group ID list are not permitted to perform contention-based transmissions during the first time period, and wherein STAs associated with group ID zero are permitted to perform contention-based transmissions during all time periods.

2. The method of claim 1, wherein the first directional beacon signal is transmitted at the beginning of the first time period.

3. The method of claim 2, wherein the first directional beacon signal is a beamformed signal directed at spatial locations within the first sector.

4. The method of claim 2, further comprising
transmitting, by the controller, a second directional beacon signal to the second group of STAs, the second group of STAs located in a second sector of the multi-sector coverage area, wherein the second directional beacon signal indicates that the second group of STAs is scheduled to perform contention-based transmissions during the second time period.

5. The method of claim 4, wherein the first time period and the second time period do not overlap.

6. The method of claim 4, wherein the first group of STAs and the second group of STAs are configured to communicate contention-based transmissions in accordance with a carrier sense multiple access with collision avoidance (CSMA/CA) mechanism, and wherein at least some STAs in the first group of STAs are beyond a signal range of some STAs in the second group of STAs.

7. The method of claim 2, wherein the first directional beacon signal schedules a first subset of STAs positioned in the first sector to perform contention-based transmissions during the first time period without scheduling a second subset of STAs positioned in the first sector to perform contention-based transmissions during the first time period.

8. The method of claim 7, wherein the first directional beacon signal specifies one or more group numbers corresponding to the first subset of STAs without specifying any group numbers corresponding to the second subset of STAs.

9. The method of claim 7, wherein the first directional beacon signal specifies one or more traffic types, the one or more traffic types corresponding to at least some data queued for transmission by the first subset of STAs.

10. The method of claim 7, wherein the first directional beacon signal carries a scheduling indicator encoded at a first coding rate, the first coding rate being decodable by the first subset of STAs without being decodable by the second subset of STAs.

11. The method of claim 10, wherein STAs in the first subset of STAs receive the first directional beacon signal over channels having sufficient signal to noise (SNR) characteristics for decoding the scheduling indicator encoded at the first coding rate, and
wherein STAs in the second subset of STAs receive the first directional beacon signal over channels having insufficient SNR characteristics for decoding the scheduling indicator encoded at the first coding rate.

12. The method of claim 2, wherein the first directional beacon signal carries a first scheduling indicator specifying that STAs having a received signal quality that is within a first range are scheduled to perform contention-based transmissions during a first portion of the first time period but not during a second portion of the first time period.

13. The method of claim 12, wherein the first directional beacon signal further carries a second scheduling indicator specifying that STAs having a received signal quality that is within a second range are scheduled to perform contention-based transmissions during the second portion of the first time period but not the first portion of the first time period.

14. The method of claim 12, wherein the first directional beacon signal further carries a second scheduling indicator specifying that STAs having a received signal quality that exceeds a threshold are scheduled to perform contention-based transmissions during both the first portion and the second portion of the first time period.

15. The method of claim 1, wherein the Wi-Fi network is a wireless local area network (WLAN) based on a Institute of Electrical and Electronics Engineers (IEEE) 802.11 standard.

16. The method of claim 1, wherein scheduling groups of STAs positioned in different sectors to perform contention-based transmissions during different time periods does not affect the radiation patterns used to perform the contention-based transmissions, and wherein at least one of the contention-based transmissions is an omni-directional transmission.

17. The method of claim 1, wherein scheduling groups of STAs positioned in different sectors to perform contention-based transmissions during different time periods does not affect the radiation patterns used to perform the contention-based transmissions, and wherein at least one of the contention-based transmissions is a beamformed transmission.

18. A controller comprising:
a processor; and
a computer readable storage medium storing programming for execution by the processor, the programming including instructions to:
schedule contention-based transmissions for multiple groups of mobile stations (STAs) in a multi-sector coverage area of a Wi-Fi network; allowing one or more STAs belonging to a default group to transmit at any time prior to association;
during association, scheduling groups of STAs positioned in different sectors of the multi-sector coverage area to perform contention-based transmissions during different time periods such that STAs contend for resources with other STAs in the same sector without contending for resources with STAs in different sectors; and
transmit a first directional beacon signal to a first group of STAs positioned in a first sector of the multi-sector coverage area, the first directional beacon signal including control signaling and excluding bearer data, wherein the first directional beacon signal indicates that the first group of STAs is scheduled to perform contention-based transmissions during a first time period, and wherein the first time period is different from a second time period during which a second group of STAs positioned in a second sector of the multi-sector coverage area is scheduled to perform contention-based transmissions, the first directional beacon signal including a group identifier (ID) list, wherein STAs associated with non-zero group IDs that are excluded from the group ID list are not permitted to perform contention-based transmissions during the first time period, and wherein STAs associated with a group ID zero are permitted to perform contention-based transmissions during all time periods.

19. The controller of claim 18, wherein the first directional beacon signal is transmitted at the beginning of the first time period.

20. The controller of claim 19, wherein the instructions further include instructions to:
transmit a second directional beacon signal to the second group of STAs in a second sector of the multi-sector coverage area, the second directional beacon signal indicating that the second group of STAs is scheduled to perform contention-based transmissions during the second time period.

21. The controller of claim 19, wherein the first time period and the second time period do not overlap.

22. The controller of claim 19, wherein the first directional beacon signal schedules a first subset of STAs located in the first sector to perform contention-based transmissions during the first time period without scheduling a second subset of STAs located in the first sector to perform contention-based transmissions during the first time period.

23. The controller of claim 22, wherein the first directional beacon signal carries a scheduling indicator encoded at a first coding rate, the first coding rate being decodable by the first subset of STAs without being decodable by the second subset of STAs.

24. The controller of claim 23, wherein STAs in the first subset of STAs receive the first directional beacon signal over channels having sufficient signal to noise (SNR) characteristics for decoding the scheduling indicator encoded at the first coding rate, and
wherein STAs in the second subset of STAs receive the first directional beacon signal over channels having insufficient SNR characteristics for decoding the scheduling indicator encoded at the first coding rate.

25. The controller of claim 18, wherein the Wi-Fi network is a wireless local area network (WLAN) based on an Institute of Electrical and Electronics Engineers (IEEE) 802.11 standard.

26. The controller of claim 18, wherein scheduling groups of STAs positioned in different sectors to perform contention-based transmissions during different time periods does not affect the radiation patterns used to perform the contention-based transmissions, and wherein at least one of the contention-based transmissions is an omni-directional transmission.

27. The controller of claim 18, wherein scheduling groups of STAs positioned in different sectors to perform contention-based transmissions during different time periods does not affect the radiation patterns used to perform the contention-based transmissions, and wherein at least one of the contention-based transmissions is a beamformed transmission.

28. A method for group sectorization to reduce the number of hidden nodes that simultaneously access an access point (AP) in a Wi-Fi network, the method comprising:
allowing one or more STAs belonging to a default group to transmit at any time prior to association; and
during association, transmitting, by the AP, sectorized beacons to geographical areas of a multi-sector coverage area of the Wi-Fi network, the sectorized beacons including control signaling and excluding bearer data, wherein the sectorized beacons instruct groups of mobile stations (STAs) positioned in different sectors of the multi-sector coverage area to perform contention-based transmissions during different intervals such that STAs contend for resources with other STAs in the same sector without contending for resources with STAs in different sectors, each of the sectorized beacons including a group identifier (ID) list, wherein STAs associated with non-zero group IDs that are excluded from a given group ID list in a given sectorized beacon are not permitted to perform contention-based transmissions during an interval associated with the given sectorized beacon, and wherein STAs associated with a group ID zero are permitted to perform contention-based transmissions during all intervals.

29. The method of claim 28, wherein the sectorized beacons include a first directional beacon signal and a second directional beacon signal, the first directional beacon signal instructing STAs in a first sector of the multi-sector coverage area to perform contention-based transmissions during a first sector interval, and the second directional beacon signal instructing STAs in a second sector of the multi-sector coverage area to perform contention-based transmissions during a second sector interval.

30. The method of claim 29, wherein a duration of the first sector interval starts with the first directional beacon signal and ends with second directional beacon signal.

31. The method of claim 28, wherein the instructions conveyed by the sectorized beacons do not affect radiation patterns used to perform the contention-based transmissions, and wherein at least one of the contention-based transmissions is an omni-directional transmission.

32. The method of claim 28, wherein the instructions conveyed by the sectorized beacons do not affect radiation patterns used to perform the contention-based transmissions, and wherein at least one of the contention-based transmissions is a beamformed transmission.

* * * * *